United States Patent [19]

Medlock

[11] 3,964,390

[45] June 22, 1976

[54] BURSTING DISC ASSEMBLY

[75] Inventor: Leslie Ernest Medlock, Alloway, Scotland

[73] Assignee: Imperial Chemical Industries Limited, London, England

[22] Filed: Mar. 13, 1972

[21] Appl. No.: 233,899

[30] Foreign Application Priority Data

Mar. 31, 1971 United Kingdom............... 8298/71

[52] U.S. Cl. ............................. 102/1 R; 102/24 R; 169/28; 220/265
[51] Int. Cl.² ..................... F42D 1/00; A62C 35/02
[58] Field of Search..................... 220/27, 265, 266; 102/24, 1 R; 169/1, 28, 29

[56] References Cited
UNITED STATES PATENTS

| 2,417,082 | 3/1947 | Mapes et al. | 169/28 |
| 2,436,364 | 2/1948 | McDowell | 1/69 |
| 2,712,881 | 7/1955 | Mathisen | 169/28 X |
| 2,754,913 | 7/1956 | MaFarlin | 169/28 |
| 2,790,389 | 4/1957 | Ackerman, Jr. | 102/37.8 |
| 3,290,256 | 12/1966 | Karpovich et al. | 169/28 N |
| 3,291,335 | 12/1966 | Vaness | 220/27 |

*Primary Examiner*—Samuel W. Engle
*Assistant Examiner*—Harold Tudor
*Attorney, Agent, or Firm*—Cushman, Darby & Cushman

[57] ABSTRACT

A bursting disc assembly wherein an explosive charge is positioned close to a destructible area of the disc within a shear line.

8 Claims, 3 Drawing Figures

BURSTING DISC ASSEMBLY

This invention relates to a bursting disc which is actuated by an explosive charge. The invention also includes a method of opening a sealed aperture quickly and completely.

In certain applications, such as for example, in fire fighting and in the rapid activation of safety devices where a flexible container is required to be rapidly inflated, fluent material is stored in a container which can be opened quickly to dispense the material when required. Usualy this dispersion is effected by rapid breaking of a portion of the container wall or rapid opening of an aperture which is sealed by a movable or rupturable member such as a bursting disc in the container wall. The bursting discs hitherto available tended to rupture unevenly rather than being removed from the aperture completely and immediately.

It is an object of this invention to provide a bursting disc assembly which, on activation, will open the aperture fully.

In accordance with this invention, a bursting disc assembly comprises a bursting disc having a shear line defining a line of minimum thickness around a destructible portion of the disc and a charge of detonating explosive positioned sufficiently close to the said destructible disc portion to break the disc around the shear line and destroy the said destructible portion when the charge is exploded.

In a preferred assembly at least the destructible portion anc conveniently the entire bursting disc, is made from material which can be shattered to a powder by the detonation of the explosive charge. The preferred material is nylon but other suitable materials include resin laminated glass fibre, resin laminated paper, polytetrafluoroethylene and sintered metal.

The explosive charge, which may be any detonable explosive, is preferably a concentrated charge located adjacent to the centre of the destructible portion of the disc. Such charge may be a solid or liquid explosive mass or a hollow charge in the form of a conventional shaped charge. Conveniently the explosive charge is in the form of an electic detonator (blasting cap) comprising an electic fusehead, a charge of initiating explosive, for example, lead azide, and a base charge, for example, of pentaerythritol tetranitrate (PETN) enclosed in a case.

The explosive charge is preferably placed in contact with the destructible portion of the disc, but, a hollow shaped explosive charge is preferably positioned with its cavity facing the disc at a 'stand-off' distance such that, on detonation, the shock-wave is focussed at the surface of the destructible portion of the disc.

The bursting disc is advantageously a circular disc with an axially symmetrical central recess on one side and an axially symmetrical peripheral rebate on the reverse side, the distance between the recess and the rebate providing the shear line.

The invention also includes a method of rapidly and completely opening an aperture sealed with member fabricated from a material which is destructible by the detonation of a juxtaposed explosive charge and having a shear line defining a line of minimum thickness formed around at least a portion thereof, which method comprises placing an explosive charge adjacent to the said member portion and detonating the charge to destroy the said member portion and open the aperture.

In order to illustrate the invention further a preferred bursting disc assembly will be hereinafter described by way of example only, with reference to the accompanying drawings wherein.

Figure 1:
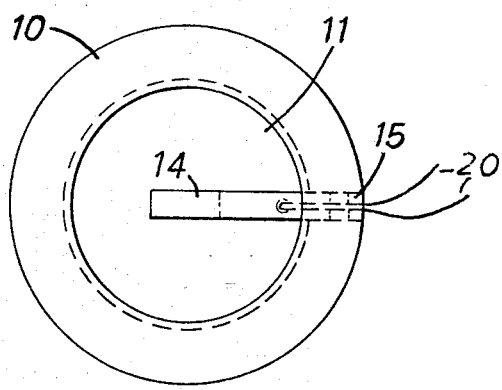
FIG. 1 is a plan of a bursting disc assembly with the detonator protective cover removed.
Figure 2:
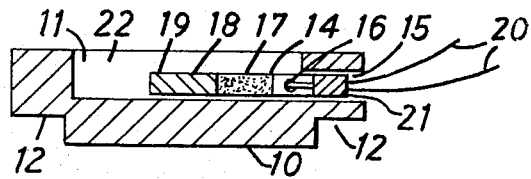
FIG. 2 is a diagrammatic sectional elevation of the assembly of FIG. 1.

In the assembly a circular bursting disc 10 of destructible material is formed with a central circular recess 11 on one side and an annular rebate 12 on the reverse side. The depths and radii of the recess 11 and rebate 12 are chosen so that the thickness of material between the corners of the recess 11 and rebate 12 defines a shear line 13.

An explosive charge in the form of an electric detonator 14 is inserted through and located in a hole 15 in the disc 10 and is thereby held against the portion of the disc 10 inside the shear line 13.

The electric detonator 14 comprises an electric fusehead 16, an initiating charge 17 and a base charge 18, all within a detonator tube 19. A pair of insulated electrical leading wires 20 connected to the fusehead 16, lead through an end plug 21 to a position outside the tube 19 for connection to an electrical power source for firing the fusehead. The recess is covered with a thin protective disc 22.

Figure 3:
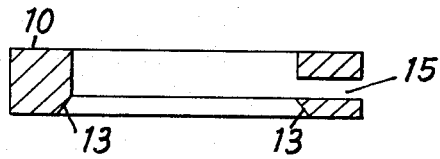
FIG. 3 is a diagrammatic sectional elevation of the assembly of FIGS. 1 and 2 after detonation of the explosive charge.

In use the disc 10 is mounted in an aperture in a vessel containing a fluent material under pressure with the charge 14 on the outside and at least a portion of the rebate 12, and the part within the shear line 13 exposed inside the vessel. The leading wires 20 are connected in circuit with a power source through an activating switch. When the contents of the vessel are required to be dispersed rapidly the switch is operated, usually by automatic means responsive to the development of a hazardous condition, and the charge 14 detonates. The detonation completely removes the portion of the disc 10 inside the shear line 13 within a few milliseconds of the completion of the electrical circuit, thereby providing a wide aperture for rapid dispersion of the contents of the vessel, as shown in FIG. 3. The vessel itself is not damaged and may be readily fitted with another bursting disc assembly and replenished with pressurised fluid for further use.

In one example of bursting disc assembly the disc 10 was moulded from nylon and had an overall diameter of 5.2 cm and an overall thickness of 1.9 cm. The recess 11 was 2.75 cm diameter and 1.0 cm deep and the rebate 12 was 6.00 mm wide and 6.75 mm deep.

The shear line 13 was 7 mm thick and the portion of the disc inside the shear line was 1.0 cm thick.

The detonator 14 had an initiating charge 17 consisting of 0.08 g. of lead azide and a base charge 18 of 0.04 g. of PETN and the tube 19 was nylon tube of 4 mm outside diameter and 3 mm inside diameter sealed with a nylon plug 21. The recess 11 was covered by a 0.02 mm thick disc 22 of polyethylene.

On detonation of the detonator 14 the portion of disc 10 inside the shear line was completley removed and shattered.

We claim:

1. A bursting disc assembly comprising a bursting disc having a shear line defining a line of minimum thickness around a destructible portion of the disc and charge of detonating explosive positioned sufficiently close to the said destructible disc portion to break the disc around the shear line and destroy the said destructible portion when the charge is exploded, said destructible portion of the bursting disc being made from a material which is selected from the group consisting of nylon, resin laminated glass fiber, resin laminated paper and polytetrafluoroethylene and which is shattered to a powder by the detonation of the explosive charge.

2. An assembly as claimed in claim 1 wherein the explosive charge is a concentrated charge located adjacent to the center of the destructible portion of the disc.

3. An assembly as claimed in claim 1 wherein the explosive charge is placed in contact with the destructible portion of the disc.

4. An assembly as claimed in claim 1 wherein the explosive charge is in the form of an electric detonator.

5. An assembly as claimed in claim 1 wherein the bursting disc is a circular disc with an axially symmetrical central recess on one side and an axially symmetrical peripheral rebate on the reverse side, the distance between the recess and the rebate providing the shear line.

6. A bursting disc assembly as in claim 1 wherein said destuctible portion is made of nylon.

7. An assembly as claimed in claim 1 wherein said destructible portion of the bursting disc being made from a material which is shattered to a powder by the detonation of the explosive charge which completely removes all the destructible portion from within the shear line leaving an aperture of a predetermined area through which free flow of fluid takes place.

8. A method of rapidly and completely opening an aperture sealed with a member fabricated from a material which is shattered to a powder by the detonation of a juxtaposed explosive charge and having a shear line defining a line of minimum thickness formed around at least a portion thereof, which method comprises forming said member portion of a material selected from the group consisting of nylon, resin laminated glass fiber, resin laminated paper and polytetrafluoroethylene and placing an explosive charge adjacent to the said member portion and detonating the charge to destroy the said member portion and open aperture.

* * * * *